United States Patent [19]

Phillips

[11] 4,187,818
[45] Feb. 12, 1980

[54] FUEL INJECTION PUMPING APPARATUS FOR INTERNAL COMBUSTION ENGINES INCLUDING MANIFOLD PRESSURE DEVICE

[75] Inventor: Ronald Phillips, Northolt, England
[73] Assignee: Lucas Industries Limited, Birmingham, England
[21] Appl. No.: 926,121
[22] Filed: Jul. 19, 1978
[30] Foreign Application Priority Data
Sep. 15, 1977 [GB] United Kingdom ............... 38467/77
[51] Int. Cl.² .............................................. F02D 1/06
[52] U.S. Cl. .......................... 123/140 R; 123/140 MP
[58] Field of Search .... 123/140 R, 140 MP, 140 MC; 251/58, 258

[56] References Cited

U.S. PATENT DOCUMENTS

| | | | |
|---|---|---|---|
| 2,233,035 | 2/1941 | Schweitzer et al. | 123/140 MP |
| 2,807,252 | 9/1957 | Downing | 123/140 R |
| 3,250,261 | 5/1966 | Wiles | 123/140 R |
| 3,429,552 | 2/1969 | Huley et al. | 251/258 |
| 3,726,263 | 4/1973 | Kemp | 123/140 R |
| 3,814,072 | 6/1974 | Gillespie | 123/140 R |
| 3,916,861 | 11/1975 | Akashi et al. | 123/140 R |

Primary Examiner—Charles J. Myhre
Assistant Examiner—P. S. Lall

[57] ABSTRACT

A fuel injection pumping apparatus for supplying fuel to an internal combustion engine includes an injection pump to which fuel is supplied by a feed pump under the control of an operator adjustable throttle means. A valve is provided intermediate the throttle means and the injection pump and includes a valve element which is subject to the outlet pressure of the feed pump and which throttles the flow of fuel between the throttle means and the injection pump. As the outlet pressure of the feed pump increases, the throttling effect of the valve element is reduced. The force exerted by the spring on the valve element is determined by a device which is responsive to the pressure of air supplied to the associated engine and the disposition of the device is such that as the pressure of air supplied to the engine increases, the throttling effect provided by the valve element decreases.

6 Claims, 4 Drawing Figures

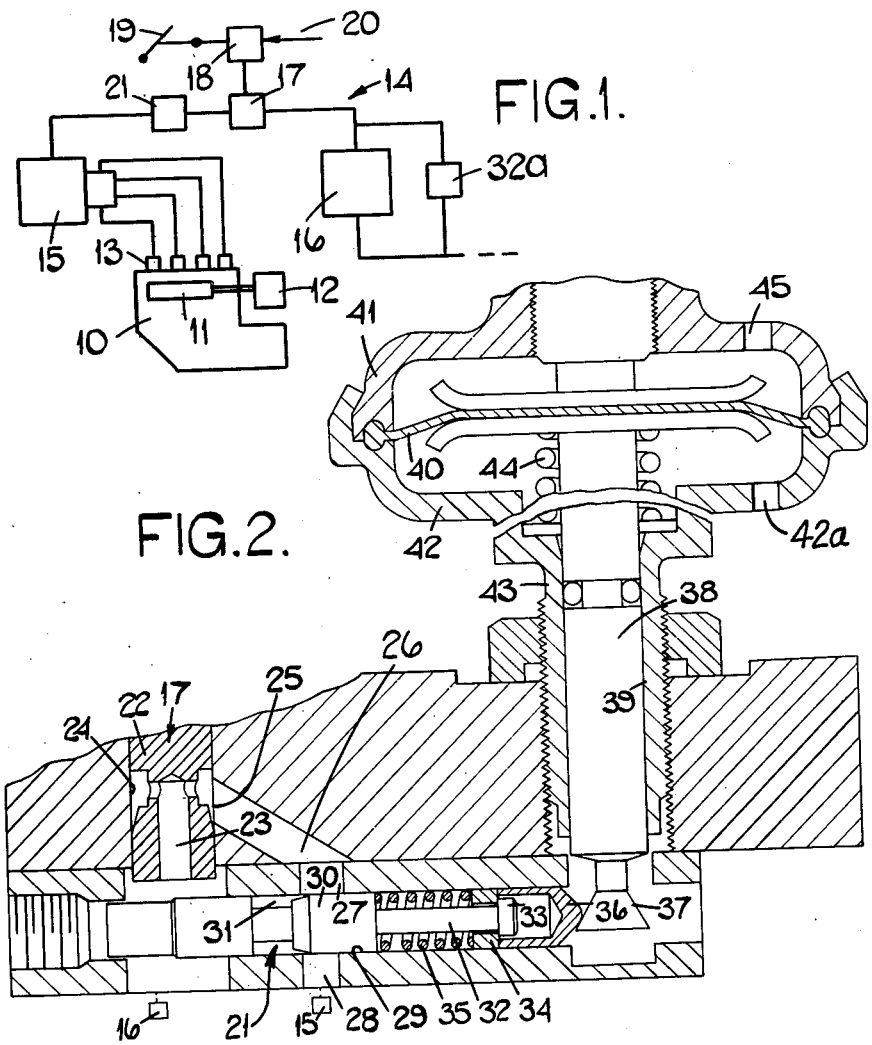
FIG.1.
FIG.2.
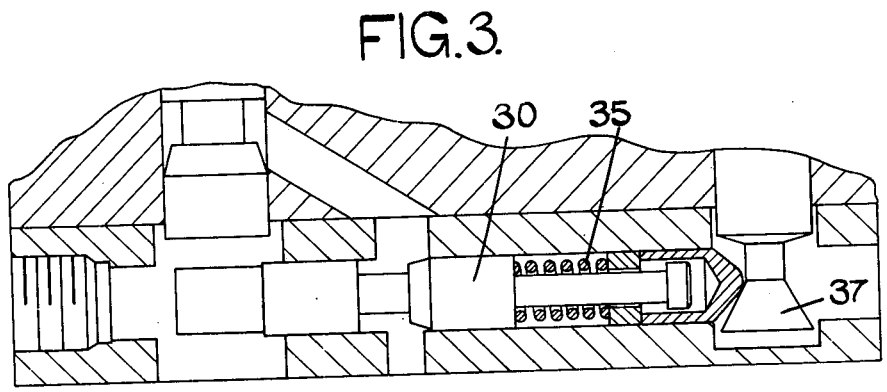
FIG.3.

FUEL INJECTION PUMPING APPARATUS FOR INTERNAL COMBUSTION ENGINES INCLUDING MANIFOLD PRESSURE DEVICE

This invention relates to fuel injection pumping apparatus of the kind comprising an injection pump operable to deliver fuel in timed relationship with an engine to which fuel is supplied by the apparatus, a feed pump for supplying fuel under pressure to the injection pump, valve means for controlling the output pressure of the feed pump so that it varies in accordance with the speed at which the apparatus is driven and an operator adjustable throttle means for varying the quantity of fuel supplied to the injection pump.

When such an apparatus is utilised to supply fuel to a supercharged engine the need arises for means incorporated in the apparatus which is responsive to the pressure of air supplied to the engine. This is so that the smoke content of the engine exhaust does not exceed a predetermined level.

The object of the invention is to provide such an apparatus in a simple and convenient form.

According to the invention, an apparatus of the kind specified comprises a valve disposed in the fuel flow path between the feed pump and the injection pump, said valve including a valve element which is subjected to the outlet pressure of the feed pump to urge the valve member in a direction to reduce the throttling effect of the valve, means responsive in use to the pressure of air supplied to the engine, an abutment engageable by a part connected to said valve member, said abutment being shaped so that with an increase in the pressure of air supplied to the engine, the valve member is moved to reduce the throttling effect of the valve, and pre-stressed resilient means interposed between said valve member and said part whereby at low engine speeds the movement of the valve member is determined solely by the means responsive to the air pressure and at a predetermined higher engine speed the output pressure of the feed pump acts to move the valve member against the action of the resilient means, in a direction to reduce the throttling effect of the valve.

One example of the apparatus in accordance with the invention will now be described with reference to the accompanying drawings, in which:

FIG. 1 shows in schematic outline the engine and the associated fuel system,

FIG. 2 shows in detail part of the apparatus seen in FIG. 1,

FIG. 3 is a view similar to FIG. 2, showing the parts in an alternative position and, FIG. 4 shows a modified arrangement of part of the apparatus seen in FIG. 2.

Figure 4:
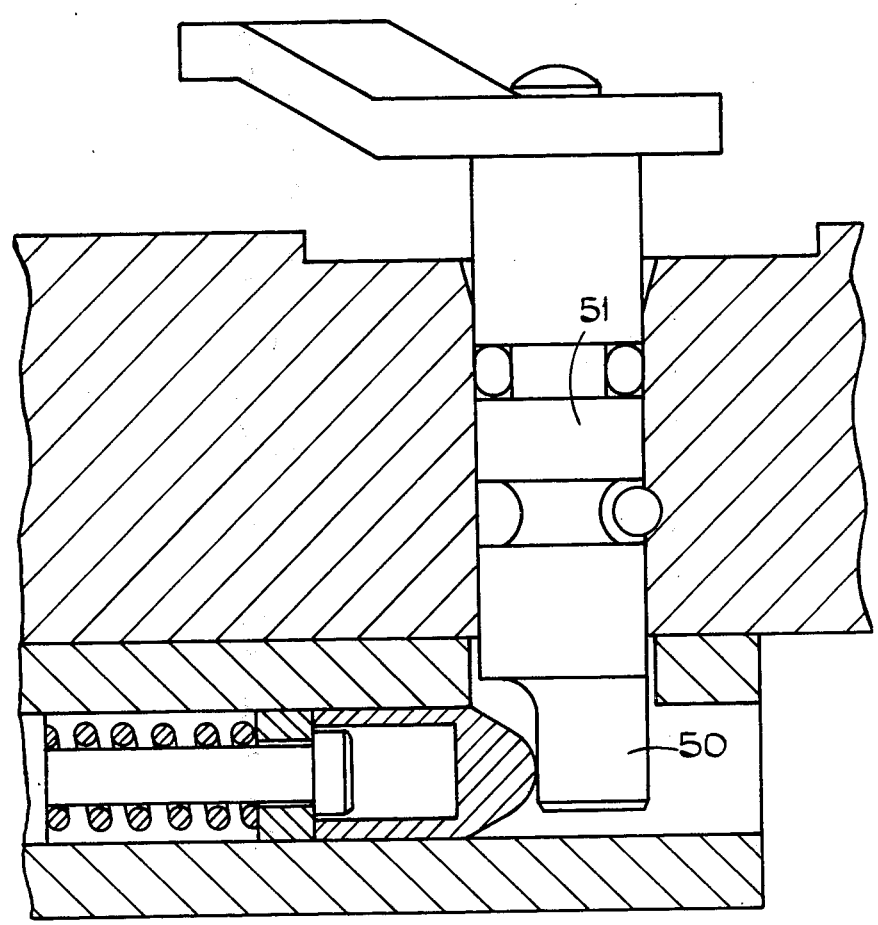

Referring to FIG. 1 of the drawings, an engine is indicated at 10, the engine being a compression ignition engine and having an air inlet manifold 11 which is connected to the outlet of a supercharger 12, conveniently a turbo-supercharger, which is driven by the exhaust gases leaving the engine. The engine is also provided with, in the particular example, four injection nozzles 13 by which means fuel is supplied to the combustion spaces of the engine in turn.

The injection nozzles are supplied with fuel by means of a pumping apparatus generally indicated at 14 and which comprises an injection pump 15, and a feed pump 16 each of which is driven by a suitable drive from the associated engine. Conveniently, the injection pump is of the rotary type including a distributor member whereby the pumping elements of the injection pump supply fuel to the injection nozzles 13 in succession. The feed pump 16 has a rotary part which is conveniently driven from the aforesaid distributor.

In order to control the amount of fuel supplied to the engine, an adjustable throttle generally indicated at 17 is provided, this being connected in a supply line from the feed pump to the injection pump. The setting of the throttle is determined by a governor mechanism 18 to which an operator adjustable control 19 is connected. The governor also receives a speed signal this being indicated by the arrow 20. In use, when the control is moved to increase the speed of the associated engine, the throttle 17 is opened to allow more fuel to flow to the injection pump 15. As the engine speed increases, then the governor mechanism 18 will act to close the throttle thereby to control the speed of the engine at the higher level determined by the setting of the control 19.

The supply of fuel to a supercharged engine, particularly an engine in which the supercharger is driven by the exhaust gases of the engine, requires very careful control. At low engine speeds the supercharger will not increase the pressure of air supplied to the engine to any appreciable extent but as the energy in the exhaust gases increases, the supercharging effect becomes more pronounced and the pressure of air supplied to the engine increases. As the pressure of air supplied to the engine increases, so more fuel can be supplied to the engine without the risk of excessive smoke in the engine exhaust.

The injection pump will incorporate maximum fuel stops so that, under no circumstances, can the maximum amount of fuel supplied to the engine exceed a predetermined value. This setting, however, will not be suitable for low engine speeds and therefore, if the maximum fuel stop were relied upon at low engine speeds smoke would be emitted from the exhaust as the engine was accelerated. It is necessary to provide some device which is responsive to the pressure of air which is supplied to the engine. For this purpose a valve 21 is provided and this is interposed between the throttle 17 and the injection pump 15. It could, however, be disposed between the feed pump and the throttle providing if it is located in this position, it does not upset the transmission of the speed signal to governor mechanism if the latter is an hydraulically operated governor.

With reference now to FIG. 2, the throttle 17 is seen to comprise an axially movable throttle member 22, in the periphery of which is formed a groove which communicates with the outlet of the feed pump by way of an axial drilling 23. The throttle member is located within a bore 24 in which is formed a port 25 the latter communicating, by way of a passage 26, with the injection pump 15. The passage 26, which constitutes part of the flow path between the feed pump 16 and the injection pump 15, includes a pair of diametrically disposed ports 27, 28 which are formed in a part which defines an axial bore 29. Slidable in the bore 29 is a valve member 30 and formed in the periphery of the valve member 30 is a groove 31 which is movable into register with the ports 27, 28. It will be noted that one side face of the groove 31 is tapered so that the throttling effect, provided by the valve member as it is moved, varies over a fairly wide range of movement of the valve member 30. The valve member is exposed at its left-hand end to the output pressure of the feed pump which is controlled, so that it varies in accordance with the speed at which the apparatus is driven. This is effected by a valve 32a shown in FIG. 1.

The valve member 30 has a reduced portion 32 which terminates in a head 33 and interposed between the head 33 and the main portion of the valve member is an annular member 34 constituting an abutment for a coiled compression spring 35. The compression spring 35 is prestressed and the abutment 34 bears against a cup-shaped member 36 within which the head 33 can move.

The end portion of the cup-shaped member is of rounded form, and can bear against a shaped abutment 37 which is mounted at the end of a rod 38 slidable in a bore 39 which extends at right-angles to the bore 29. The rod member 38 is connected to a diaphragm 40. The diaphragm 40 is located in a chamber defined by a pair of housing parts 41, 42 the periphery of the diaphragm conveniently being retained between the aforesaid housing parts. The housing part 42 is connected to a hollow cylindrical member 43 which defines the bore 39 and the part 43 is in adjustable screw-threading engagement with the body part of the apparatus. As is usual with the type of diaphragm employed, its central portion is sandwiched between a pair of plates, and interposed between the plates and the part 43, is a coiled compression spring 44. The portion of the chamber defined by the diaphragm 40 and the housing part 41 is provided with an inlet 45, for connection to the inlet manifold of the engine, so that it is subjected to the pressure of air supplied to the engine. The chamber defined by the diaphragm 40 and the housing part 42 communicates with the atmosphere through a bore 42a.

The setting of the parts as shown in FIG. 2 applies when the engine is at rest. The setting of the abutment 37 is such that the valve member 30 is moved its maximum extent towards the left and the head 33 is in contact with the ring 34.

When the engine is started, the output pressure of the feed pump acts on the valve member to maintain the cup-shaped member 36 in contact with the abutment 37 and the parts will remain substantially in the position in which they are shown in FIG. 2. As the engine speed is increased and the pressure of air delivered to the engine increases, the pressure of air acting on the diaphragm 40 will move the rod member 38 downwardly and as a result, the abutment 37 will also move downwardly to allow the valve member 30 to move towards the right. As a result, an increased quantity of fuel can be supplied to the engine, providing the throttle 17 is opened sufficiently wide so that its throttling effect is low compared with the throttling effect of the valve.

As the engine speed further increases, the force exerted by the output pressure of the feed pump acting on the valve member 30 will overcome the preload of the spring 35 and the valve member 30 can move further towards the right as shown in FIG. 3. In FIG. 3, it will be seen that the valve member 30 has moved substantially its maximum extent and in this position, it offers substantially no restriction to the flow of fuel to the injection pump. It will also be noted in FIG. 3 that the abutment 37 has moved downwardly so that the cup-shaped member 36 is about to engage a plain portion of the abutment.

The practical effect of the arrangement described is that at low engine speeds and when the air pressure supplied by the supercharger is also low, the amount of fuel which can flow to the injection pump is severely restricted by the valve 21. As the pressure of air delivered by the supercharger increases, then an increased quantity of fuel can be supplied to the engine. Finally, when the engine speed attains a predetermined value, the valve member starts to move under the action of the output pressure of the feed pump and again, the quantity of fuel which is supplied to the engine can be increased.

In a practical arrangement, it is arranged that the valve member 30 starts to move under the action of the output pressure of the feed pump when the engine speed attains 1500 revolutions per minute, and the movement of the valve member under the action of the fuel pressure is completed by the time the engine speed attains 3,000 revolutions per minute.

It has been mentioned that the part 43 is adjustably mounted in the body of the pump and this enables the initial degree of restriction offered by the valve to be adjusted.

In the arrangement which is shown in FIG. 4, the abutment 50 is not axially movable but is angularly movable and it is connected to a rod member 51 which exterior of the body of the apparatus, is connected to a lever which is operatively connected to a diaphragm subjected, as in FIG. 2, to the pressure of air supplied to the air inlet manifold.

The fact that the valve member is additionally responsive to the variation in the output pressure of the fuel pump is because the pressure of air supplied by the supercharger attains a maximum value at a speed which may be below the maximum engine speed. If therefore the valve were directly coupled to the diaphragm and moved only by the diaphragm, it would offer an undesirable restriction to the flow of fuel at high engine speeds. With the arrangement described, however, this does not take place, since the valve member can move under the action of the fuel pressure. It should be pointed out however that it is desirable to have the valve member moved by the fuel under pressure even when the supercharger is of the type in which the outlet pressure increases as the engine speed increases up to the maximum engine speed of the engine. The reason for this is that it would be necessary to dispense with a comparatively cheap diaphragm and utilize a long stroke piston in order to be able to control the valve member properly. This difficulty is overcome by having the valve member also moved by the fuel pressure at the outlet of the feed pump.

I claim:

1. A fuel injection pumping apparatus comprising an injection pump operable to deliver fuel in timed relationship with an engine to which fuel is supplied by the apparatus, a feed pump for supplying fuel under pressure to the injection pump, valve means for controlling the output pressure of the feed pump so that it varies in accordance with the speed at which the apparatus is driven, an operator adjustable throttle means for varying the quantity of fuel supplied to the injection pump, a valve disposed in the fuel flow path between the feed pump and the injection pump, said valve including a valve element which is subjected to the outlet pressure of the feed pump to urge the valve element in a direction to reduce the throttling effect of the valve, means responsive to the pressure of air supplied to the engine, an abutment movable by said last-mentioned means and engagable by a part connected to said valve element, said abutment being shaped so that with an increase in the pressure of air supplied to the engine, the valve element is moved to reduce the throttling effect of the valve, and pre-stressed resilient means interposed between said valve member and said part whereby at low engine speeds the movement of the valve element is determined solely by the means responsive to the air pressure and at a predetermined higher engine speed the output pressure of the feed pump acts to move the valve element against the action of the resilient means, in a direction to reduce the throttling effect of the valve.

2. An apparatus according to claim 1 in which said valve element is accomodated within a bore, one end of said bore communicating with the outlet of the fuel pump, a pair of ports opening into said bore, a groove on said valve element and which is brought into register with said ports as the valve element is moved by the fuel under pressure, said ports and said groove forming part of the fuel flow path, the other end of said valve element being of reduced section and defining a shoulder against which bears a coiled spring constituting said prestressed resilient means, the other end of said spring engaging an abutment ring slidable upon the reduced end portion of the valve element, said part engaging said abutment ring and being of thimble shape.

3. An apparatus according to claim 1 in which the means responsive to the pressure of air supplied to the engine comprises a diaphragm, which serves to divide a chamber into two portions, one of said chamber portions in use being connected to the air inlet manifold of the associated engine, the other of said chamber portions being open to the atmosphere, means connecting said diaphragm to said abutment and resilient means which loads said diaphragm in opposition to the pressure of air supplied to said one portion of the chamber.

4. An apparatus according to claim 3 in which said means connecting the diaphragm to the abutment comprises a rod slidable within a bore formed in a part adjustably mounted on the housing of the apparatus, said rod being secured at one end to said diaphragm and at its other end being shaped to define said abutment.

5. An apparatus according to claim 3 in which said abutment is angularly movable, said means connecting the diaphragm comprising an angularly movable rod mounting said abutment, said rod extending to the exterior of the housing of the apparatus, and carrying a lever connected to the diaphragm.

6. An apparatus according to claim 4 in which the abutment is of generally conical form.

* * * * *